United States Patent [19] [11] 4,054,880
Dalabakis et [45] Oct. 18, 1977

[54] POSITION FIXING SYSTEM UTILIZING PLURAL COMMERCIAL BROADCAST TRANSMISSIONS AND HAVING FREQUENCY CORRECTION

[75] Inventors: Eli J. Dalabakis, Seminole; Harry D. Shearer, St. Petersburg, both of Fla.

[73] Assignee: E-Systems, Inc., Dallas, Tex.

[21] Appl. No.: 650,006

[22] Filed: Jan. 19, 1976

[51] Int. Cl.$^2$ ............................................... G01S 5/14
[52] U.S. Cl. ........................... 343/112 R; 343/112 D; 343/112 TC; 364/451; 364/458
[58] Field of Search ........ 343/112 D, 112 TC, 112 R; 235/150.27

[56] References Cited
U.S. PATENT DOCUMENTS

| 3,747,106 | 7/1973 | Dalabakis et al. | 343/112 D |
| 3,889,264 | 6/1975 | Fletcher | 343/112 D |

Primary Examiner—Maynard R. Wilbur
Assistant Examiner—Richard E. Berger
Attorney, Agent, or Firm—Robert V. Wilder

[57] ABSTRACT

A radio navigation, position locating and signaling arrangement employs three operative channels per vehicle for receiving three commercial radio transmissions. Each channel includes feedback circuitry for maintaining a constant phase relationship between a replica of the received broadcast carrier and a reference oscillation, both reduced in frequency. An accumulator in each channel records the number of pulses added and/or deleted from the reference pulse train to provide a measure of the radial distance travelled by a vehicle with respect to the corresponding fixed radio transmitters. Common central station equipment processes the reported vehicle accumulated coordinate pulse counts, and corrects such vehicle coordinate fixing information for frequency error in the non-cooperative commercial transmissions and in the vehicle mounted local reference oscillations.

12 Claims, 13 Drawing Figures

FIG. 7 (PER VEHICLE)

POSITION FIXING SYSTEM UTILIZING PLURAL COMMERCIAL BROADCAST TRANSMISSIONS AND HAVING FREQUENCY CORRECTION

DISCLOSURE OF INVENTION

This invention relates to electronic navigation apparatus and, more specifically, to a system for accurately determining the position of a vehicle utilizing commercial radio broadcast transmissions, corrected for system frequency variations.

Several systems have heretofore been implemented which permit a vehicle to determine its position via the use of special radio transmissions. Such systems typically operate over a broad territorial expanse and include, for example, LORAN which employs physically spaced master and slave pulse transmitting stations. A vehicle determines its position by making electrical pulse delay measurements, essentially utilizing a hyperbolic intersection process. Another such system is disclosed in our U.S. Pat. No. 3,747,106, issued July 17, 1973, the disclosure of which is included herein by reference.

It is an object of the present invention to provide a radio navigation, position locating system which does not contribute to the already crowded radio frequency spectrum, i.e., which utilizes signals provided by commercial broadcasting, and which accounts for frequency drifts in the non-cooperative commercial transmissions and local independent system reference oscillations.

The above and other objects of the present invention are realized in a specific, illustrative radio position locating arrangement which employs three channels, each tuned to a different radio station. In each channel, the incoming carrier is divided down to a selected frequency, e.g., 10 Khz, as is the output of a local reference oscillator of fixed frequency.

The two 10 Khz signals are supplied as inputs to a phase detector which is responsive to the changing phase relationship which obtains as the vehicle moves with respect to the three fixed transmitting stations. The output of the phase detector causes pulses to be added to or deleted from the reference oscillator pulse train to maintain the two 10 Khz in a predetermined phase relationship.

A running net total of added and/or deleted pulses is accumulated to provide a measure of the vehicle's movement in one coordinate direction from its starting point. The accumulations of all three channels defines the total displacement of the vehicle and, if the starting point is known, its position.

The three coordinate accumulations are communicated to a central station where they are corrected for system frequency error, i.e., frequency drifts of non-cooperative commercial broadcasts, and of the several vehicle independent reference oscillations.

The locator arrangement may thus be employed, for example, in an urban or suburban environment for scheduling purposes, i.e., to maintain the real time disposition of a fleet of vehicles, such as taxis, transit or emergency vehicles, trucks or the like for dispatch, routing and/or other control. Similarly, the arrangement may be employed for pleasure boat position location or to determine the situs of emergency situations. As above noted, it is a noncooperative system requiring no changes to existing commercial broadcast stations.

The above and other features and advantages of the present invention will become more clear from the following detailed description of specific embodiments thereof, presented hereinbelow in conjunction with the accompanying drawing, in which:

Figures 1, 2:
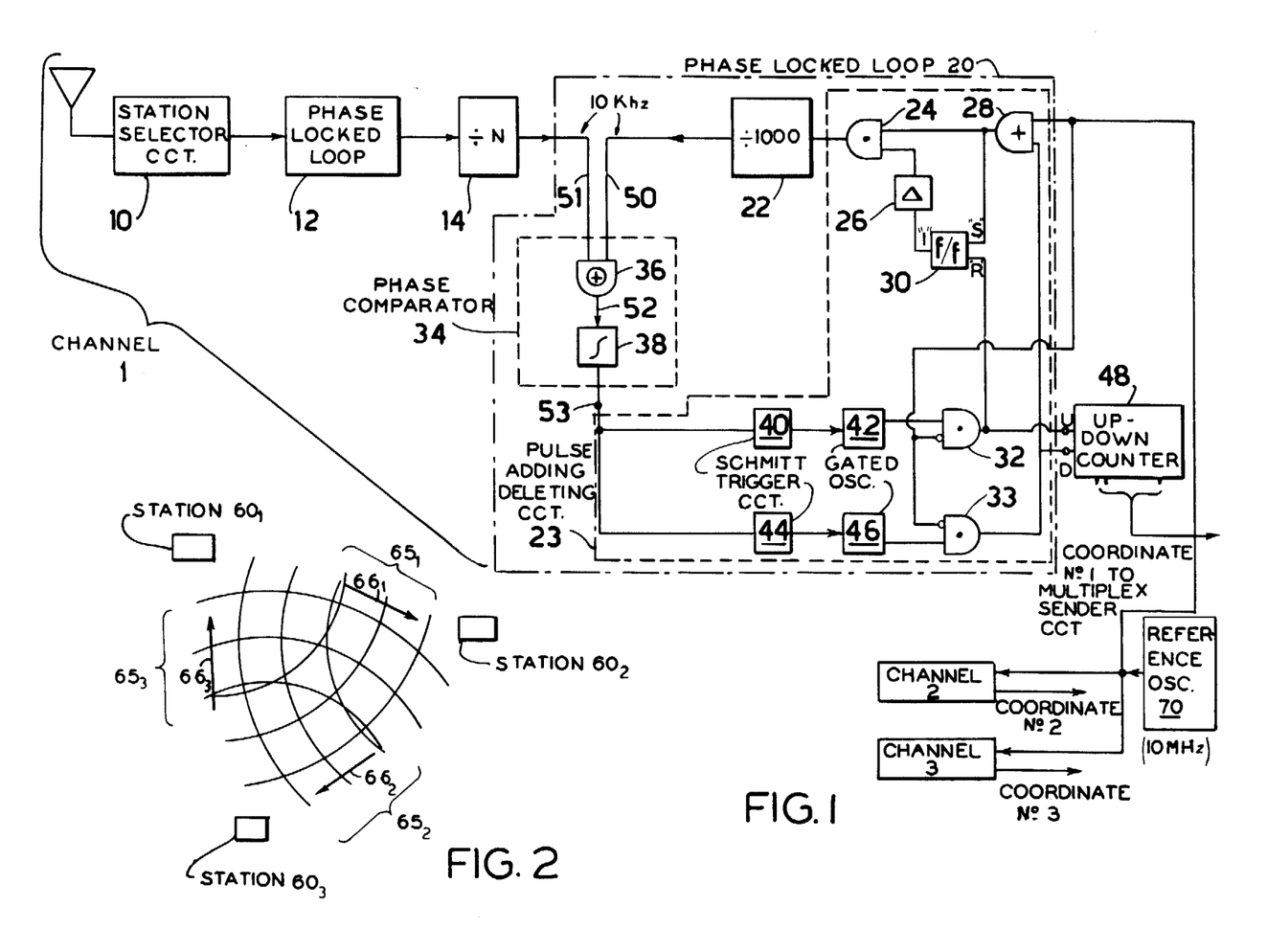
FIG. 1 illustrates in block diagram form the vehicle mounted portion of a radio navigation, position locating arrangement.
FIG. 2 depicts the loci of constant phase signals emitted by three radio stations.

Referring now to FIGS. 1 and 2, there is shown the vehicle mounted, uncorrected data accumulating portion of a position monitoring system wherein the position of a vehicle, having the locator apparatus of FIG. 1, is determined through the use of three local standard broad broadcast transmissions, e.g., those emitted by three spaced AM radio stations $60_1$ through $60_3$. Each station emits modulated carrier signals wherein the loci of constant phase for any transmission are concentric circles about the transmitter station. Thus, for example, the circle segments $65_1$ are lines of constant signal phase for emissions from the station $60_1$, this signal having a gradient of maximum phase change in the radial direction $66_1$. Correspondingly, the phase loci $65_2$ and $65_3$ for the stations $60_2$ and $60_3$, along with the concomitant phase gradients $66_2$ and $66_3$ are also shown in FIG. 2. The phase loci 65 thus in essence form a coordinate grid network in the geographical area between the stations $60_1$ through $60_3$.

In accordance with the basic aspects of the present position fixing system, a vehicle which operates in the grid is supplied with receiver apparatus having three channels 1–3 for receiving the carrier signals emitted by the corresponding stations $60_1$ through $60_3$. As the vehicle moves from a known starting point in the grid, the phase change of each received radio carrier is monitored. As more fully described hereinbelow, the net phase change data accumulated for each of the three received carrier signals unambiguously defines the change in position for the vehicle relative to its starting point.

With reference to FIG. 1, the vehicle location equipment includes three similar channels 1–3, channel 1, illustrative of the other receiver channels, being shown in detail. With respect to channel 1, a station selector circuit 10 is tuned to receive a corresponding radio transmission, e.g., the AM signal emitted by a local commercial station $60_1$. The received AM program is then supplied to a phase locked loop 12 which isolates the carrier of the received signal, discarding its modulation products. The phase locked loop 12 also converts the output to digital form. Embodiments for the phase locked loop 12 are commercially available and are readily apparent to those skilled in the art. The carrier may alternatively be isolated by a sharply turned radio frequency bandpass filter in the selector circuit 10, a limiter or saturating amplifier being used to convert the sinusoidal carrier to digital form.

The received carrier wave is reduced in frequency by a digital divider network 14. Since all AM broadcast stations have a carrier frequency which is an integral multiple of 10 Khz, 10 Khz becomes a convenient output for the divider 14 in each channel. Thus, for the AM station, N assumes a number between 55 and 160 based upon the frequency of the associated station. Modulo N counters for any N are well within the skill of the art, either by directly cascading counter modules, or by feedback gating to eliminate count states.

Correspondingly, a reference oscillator 70 common to all channels for the particular vehicle being considered is employed, and emits an output wave having an output frequency which is an integral multiple of 10 Khz, e.g., 10 Mhz. The oscillator output pulses quiescently pass through a pulse adding-deleting circuit 23 described hereinbelow to a divide-by-1000 network 22 which thus furnishes a 10 Khz output wave.

The two 10 Khz pulse trains, present at the circuit points 50 and 51, are maintained in a predetermined phase relationship by the action of a composite phase locked loop circuit 20. It will be seen from FIG. 2 that when the vehicle has a component of displacement in the direction of the vector $66_1$ (radially away from the station $60_1$), the phase of the 10 Khz waveform supplied by the divider 14 will slip with respect to the 10 Khz feedback, or reference wave corresponding to the divided output of the reference oscillator 70. Correspondingly, if the vehicle has a component of motion in a direction toward the transmitter $60_1$, the output of the divider circuit 14 will advance in phase relative to the 10 Khz waveform present at the circuit point 50.

Composite phase locked loop circuitry 20 operates to maintain the 10 Khz feedback wave present at the circuit point 50 in a predetermined phase relationship with the wave supplied by the divider network 14, this latter waveform varying in phase as the vehicle moves through the grid with a component of motion normal to the transmitter $60_1$. To accomplish this, a phase comparator 34 provides an analog output at a circuit point 53 which varies in amplitude with the relative phase relationship between the two input 10 Khz waves. When the vehicle moves in a direction away from the station $60_1$, the analog output voltage of the phase comparator 34 causes the pulse adding-deleting circuit 23 to delete a pulse in the train supplied by the oscillator 70. This introduces a corresponding lag in the phase of the 10 Khz waveform at circuit point 50, thereby bringing the waveforms at the points 50 and 51 back into substantial synchronization (phase lock). Correspondingly, if the subject vehicle has a component of motion toward the station $60_1$, an opposite change in the output of the phase comparator 34 causes the pulse adding/deleting circuit 23 to add an extra pulse into the train supplied by the oscillator 70 to advance the phase of the feedback 10 Khz oscillation (circuit point 50) to again maintain the predetermined phase relationship between the two 10 Khz waveforms.

Signals representative of the added and deleted pulses produced by action of the circuit 23 are respectively supplied to the "down" and "up" count inputs of a channel up-down counter 48. The counter 48 is initially preset at either to a cleared condition, or to a known value corresponding to the starting point of the vehicle. Each pulse added to the pulse train of the oscillator 70 by the circuit 23 (corresponding to a single up count being registered in the counter 48) signals that the vehicle has moved a distance of 98.4 feet toward the station $60_1$, while each down count signals a like displacement away from the station. The net contents of the counter 48 is then a direct measure of distance moved in the direction normal to the transmitter 60, and is either absolute coordinate position information if the counter is preloaded with starting point information, or relative displacement information if the counter starts from a cleared state. The coordinate, of course, comprises radial movement with respect to the physical location of the transmitter 60. The absolute 98.4 feet measure (independent of carrier frequency) follows from the 98,400 foot wave length of 10 Khz signal, divided by 1000 to reflect the fact that each pulse is scaled down by a factor of 1000 in the divider 22 as to its relative bearing in forming the 10 Khz output of this counter.

Absolute position of the vehicle may thus be completely and unambiguously determined from the outputs of the counter 48 in each of the channels 1-3. The vehicle's approximate position (uncorrected for system oscillator variations) may be determined from tables supplied to a user. Preferably, the coordinate accumulations for each vehicle are communicated back to a central station, as by any multiplex communication apparatus, well known per se, for position determination by entry into data processing apparatus considered hereinbelow.

Figure 3A:
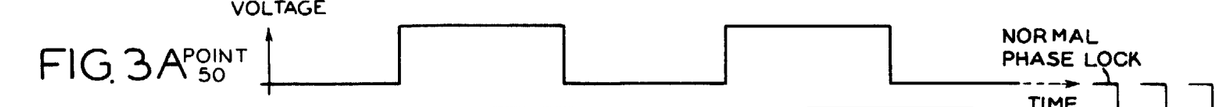
FIG. 3A-3G are timing diagrams depicting voltage waveforms appearing at selected circuit positions in FIG. 1 under varying phase conditions.
Figure 3B:
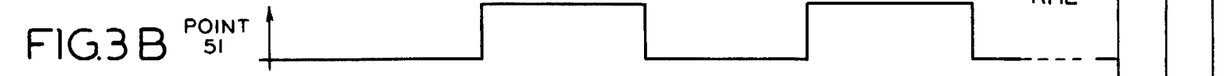
Figure 3C:
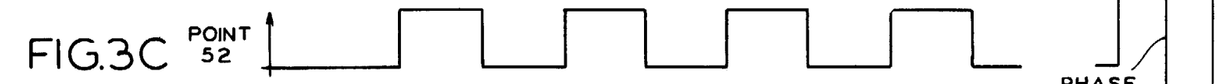

The particular operation of the circuit elements effecting the above mode of system operation will now be considered. The phase comparator 34 may in a simple form thereof simply comprise an Exclusive OR gate 36 having its output supplied to an integrator or low pass filter 38. FIGS. 3A and 3B depict one predetermined relationship for the phase locked conditions of the two 10 Khz signals at the circuit points 50 and 51 of FIG. 1, viz., disposed 90° apart. The output of the Exclusive OR circuit 36, high when one and only one of the two inputs is high, is shown in FIG. 3C. The integrator 38 provides an output DC voltage proportional to the average value of the waveform of the Exclusive OR output wave shown in FIG. 3C, and corresponds to the value $a$ in the phase comparator transfer characteristic shown in FIG. 4. This precise locked condition is also indicated by the line 57 at the 90° point in FIG. 4.

Figure 3D:
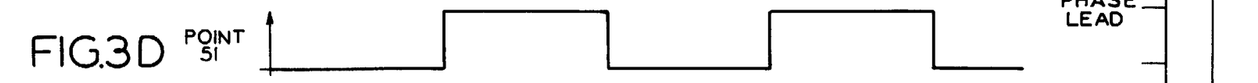
Figure 3E:
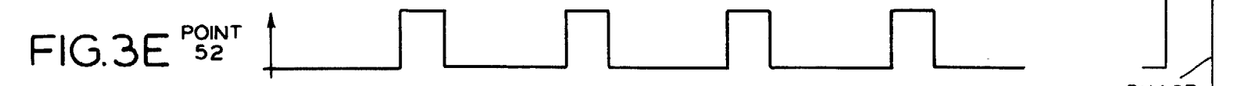
Figure 3F:
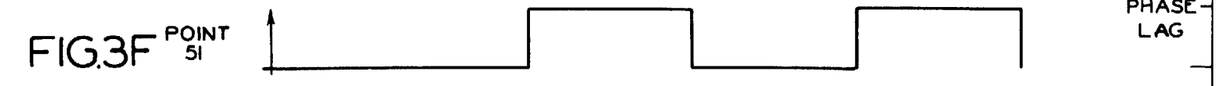
Figure 3G:
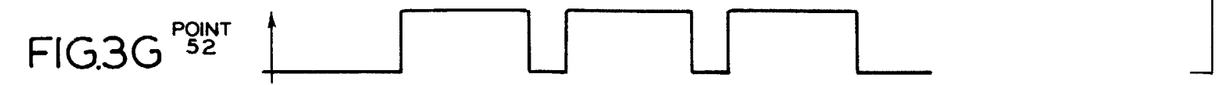

With reference to FIGS. 3A, 3D, and 3E, it will be seen that the average value, or duty cycle at the output of the exclusive OR gate 34 decreases as the vehicle moves toward the station $60_1$, that is, as the received and divided carrier wave at point 51 advances or leads its nominal relative phase shown in FIG. 3B. Accordingly, the analog output of the integrator 38, at circuit point 53, decreases in an amount directly proportional to the amount of the phase of lead (vehicle spatial displacement). Correspondingly, with reference to FIGS. 3A, 3F, and 3G, the analog output at circuit point 53 increases as the vehicle moves away from the station, i.e., as the waveform supplied by the divider 14 slips or lags from its quiescent relative phase of FIG. 3B.

As long as the relative phase between the two 10 Khz waves at circuit points 50 and 51 is between the bounds 58 and 59 shown in FIG. 3, the pulse adding/deleting circuit 23 is passive, and no pulses are added to, or deleted from the pulse train supplied to the counter by the oscillator 70. When the vehicle makes a significant movement radially toward the transmitter $60_1$, i.e., a movement of 98.4 feet, the phase lead exceeds the bound 59 and the output voltage from the comparator 34 at the point 53 falls below the value $b$ shown in the transfer characteristic of FIG. 4. When this condition obtains, a threshold circuit 44, e.g., a Schmitt trigger, switches and presents a relatively high output voltage which enables a gated oscillator 46. The gated oscillator 46, like an oscillator 42 discussed hereinbelow, may comprise any well-known embodiment therefor, e.g., AC coupled logic gates in a gated astable multivibrator configuration, a unijunction transistor or other relaxation oscillator, or the like.

The enabled oscillator 46 supplies an output pulse which flows through a gate 33 for purposes discussed hereinbelow, and through an OR gate 28 and an AND gate 24 to supplement the reference oscillator bit stream. This added pulse advances the phase of the 10 Khz waveform at the circuit point 50 to again bring the two inputs to the phase comparator 34 back into the approximate synchronized relationship of FIGS. 3A and 3B, the phase relationship being within the bounds 58–59 of FIG. 4.

The output pulse from the enabled oscillator 46 and the gate 33 is also supplied to the "down" input count terminal of the counter 48 to reflect the assumed movement of the vehicle toward the station $60_1$. Upon again regaining its proper phase synchronization, the analog output from the comparator returns to the bounds $b - c$ to restore the trigger circuit 44 and shut off the oscillator 46.

Figure 4:
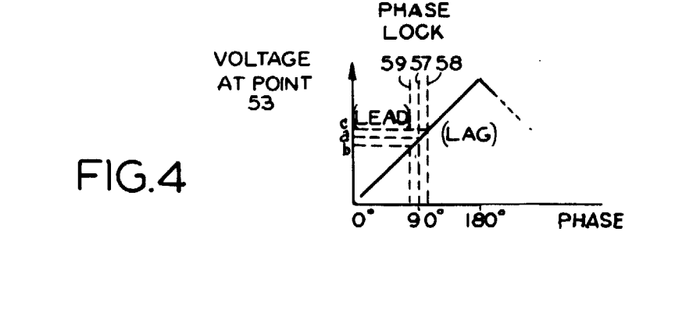
FIG. 4 depicts the transfer characteristic for a phase comparator of FIG. 1.

Similarly, when the vehicle moves a sufficient distance away from the station, the concomitant phase lag (phase 3A, 3F, and 3G) produces an output at the circuit point 53 which exceeds the level of $c$ of FIG. 4 to the corresponding switching threshold of a Schmitt trigger 40. The trigger circuit 40 enables the gated oscillator 42 which supplies a pulse via an AND gate 32 which resets a normally set flip-flop 30. The reset flip-flop 30 serves to delete one pulse supplied by the oscillator 70. That is, the resulting relatively low output voltage at the "1" output of the reset flip-flop 30, acting through a delay element 26, disables the AND gate 24 such that the next following output pulse from the oscillator 70 is prevented from reaching the divider 22. This deleted oscillator pulse is instead employed to again set the flip-flop 30. All subsequent cycles from the oscillator 70 pass through the gates 28 and 24 in the manner described above. Further, the output pulse provided by the enabled oscillator 42 is supplied to the "up" count input of the counter 48 to advance the state of the counter 48 by one, thus signalling a movement of 98.4 feet away from the station 61.

The gates 32 and 33 are provided to block an output from an enabled associated oscillator 42 or 46 during the presence of an output pulse from the oscillator 70 at which time such gated oscillator output pulses would have no effect, or would create a race condition. This inhibiting action is effected by the inverting inputs of the gate 32 and 33 which require a low output from the oscillator 70 to pass the output of the associated oscillator 42 or 46 herethrough. Since the count inputs of the counter 48 receive only pulses which operatively effect an addition or deletion of a pulse in the reference oscillator stream, it is immaterial that one or more outputs from an oscillator 42 or 46 may be suppressed by reason of a high output from the reference oscillator 70 before a pulse addition or deletion operation is executed.

The above vehicle mounted apparatus provides uncorrected three-coordinate position information for a vehicle by examining the phase of three radio carriers, conveniently those generated by local commercial AM stations. The displacement information generated in the counter 48 of each of three channels may be used in the vehicle or, preferably, communicated to central station apparatus to provide relative or absolute position information, and where the common, central station equipment corrects the accumulated coordinate defining count data for time variations in the non-cooperative commercial transmitter $61_1$–$61_3$, and in the vehicle reference oscillator 70.

Figure 5:
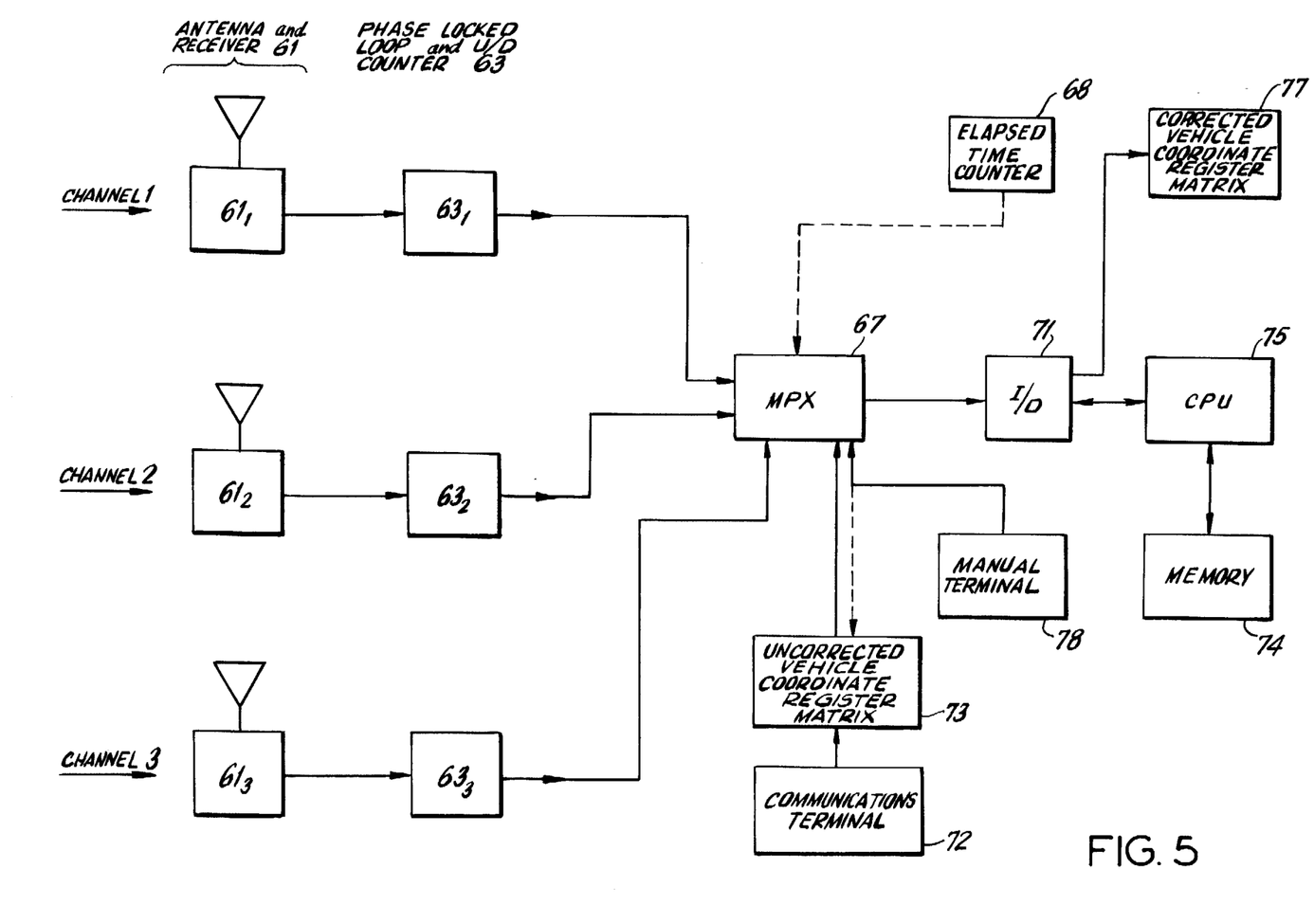
FIG. 5 depicts in block diagram form first illustrative common station equipment for said position locating system.

Referring now to FIG. 5, there is shown illustrative centrally disposed common equipment for processing the three vehicle travel identifying coordinate signals furnished by the counters 48 in each of the vehicles. In particular, the apparatus of FIG. 5, operative in the manner shown by the FIG. 6 flow chart, corrects the raw vehicle-supplied information for any frequency variations which have occurred for transmissions by any station $61_1$–$61_3$, and also for variations in frequency of a vehicle reference oscillator 70 from the prescribed (10Khz integral multiple) rate.

The particular common equipment apparatus shown in FIG. 5 comprises stored program computing apparatus including a central processing unit (CPU) 75 operative in conjunction with a memory 74. The central processing unit 75 is supplied with various requisite system variables via a multiplexer 67 operative in conjunction with any standard input/output interfacing unit 71. In particular, in a manner below discussed, the central processing unit 75 and memory 74 are supplied with a measure of the channel 1 commercial broadcast frequency drift via channel 1 correction circuitry comprising an antenna and receiver $61_1$ and a phase locked loop and up-down counter $63_1$. The multiplex unit 67 is similarly supplied with corresponding information from channel 2 and channel 3 processing elements 61 and 63; and with the three uncorrected coordinate count variables furnished from each of the several system vehicles via a communications receiving terminal 72 and a register array or matrix 73. Further, the central processing unit 75 is shown as receiving via multiplexer 67 and input/output unit 71 the contents of a counter 68 which comprises information defining the time elapsed since the system was last initialized, e.g., all system counters and registers cleared. This is shown as a conceptual matter since such elapsed time information may readily be obtained from an internal clock maintained by substantially all central processors 75. The corrected coordinate displacement values determined by the composite FIG. 5 apparatus are loaded by the central processing unit 75 and input/output unit 71 into a storage or register matrix 77. Alternatively, such corrected vehicle motion defining coordinates may simply be left in a portion of the memory 74. The communications terminal 72 depicted in FIG. 5 may simply comprise a receiver for receiving coordinate modulated transmissions from the several vehicles and loading the registers 73, using frequency division or time division multiplexing or the like to receive the broadcasts from the vehicle plurality in any manner well known to those skilled in the art. Alternatively, where off line vehicle reporting is implemented, e.g., where each vehicle operator is obliged to "call in" or the like periodically to report the contents of his registers 48, the register matrix 73 may simply be loaded by a manual entry terminal 78. Further, the manual entry terminal 73 may load the memory 74 via elements 67, 71 and 75.

The manner in which the equipment 61, 63 provides a count signal correcting for cumulative frequency drift characterizing an associated one of the three local A.M. commercial stations $61_1$–$61_3$ will now be considered. In particular, the channel 1 equipment, illustrative of the like channel 2 and channel 3 structure, will be examined. The channel 1 common apparatus includes antenna and receiver structure 61, and phase locked loop and up-down counter 63 which may identically duplicate the station selector circuit 10, phase locked loop 12, divide-by-$n$ counter 14, phase locked loop 20, up-down counter 48 and reference oscillator 70 of FIG. 1 - the oscillator 70 for the common equipment being carefully regulated and of high accuracy. Thus, the composite apparatus $61_1$ and $63_1$ identically performs as does the like FIG. 1 apparatus and provides a net count state for the up-down counter there included (analogous to the counter 48) which provides a measure of the apparent motion of the common equipment, vis-a-vis the channel 1 broadcast transmitter for the time interval since the system was last cleared. Of course, the common equipment will typically be stationary and thus not have any real motion relative to the transmitter. If the broadcast equipment were exactly on frequency and maintained so, the counter contents of element $63_1$ would be zero and remain zero for all time. Thus, to the extent that the up-down counter in the element $63_1$ has any non-zero output, it reflects apparent motion caused by undesired frequency variations in the non-cooperating channel transmitter broadcast. Like apparent motion signals for transmitter $61_1$ are also sensed by all of the monitored vehicles in the system. Thus, the channel 1 coordinates reported by the vehicles really consists of two parts: (1) an actual motion describing parameter and (2) an error component, including apparent motion caused by carrier frequency variations. This latter error component is presented at the output of the up-down counter in circuitry $63_1$ and is supplied to the multiplexer 67. By identical functioning, the phase locked loop and up-down counters $63_2$, $63_3$ present error correction signals for the commercial transmissions corresponding to channel 2 and channel 3 signal processing.

With the above structure in mind, attention will be directed to the manner in which the stored program central processing unit 75 and memory 74 operate in conjunction with the variables supplied thereto for effecting correction of the raw data reported by the several system vehicles via the three counters 48 contained in each vehicle. These parameters as above described are all communicated to the memory 74 via the multiplexing unit 67, the input/output unit 71 and the central processing unit 75, all in the manner well known to those skilled in the art.

Let:

C(I,J) be a two index memory 74 storage matrix (and corresponding computation variable designation) each storage cell of which contains a count reported by the up-down counter 48 of a vehicle, the index I being the vehicle designation, and J being the coordinate (i.e., motion relative to transmitter $61_1$, $61_2$ or $61_3$) for the vehicle. Thus, I assumes the values 1-N for a system monitoring N vehicles and, for each vehicle, J assumes the values 1-3 for the three transmissions used;

N is the number of vehicles monitored in the system;

TE(J) is a 1-by-3 array of three storage cells for the cumulative transmission errors reported by the up-down counters of elements $63_1$–$63_3$;

ELT is the elapsed time since the system was last initialized; and

KLØD(I) is a 1-by-N matrix each variable of which contains the rate of error caused by variations in the local oscillator 70 of a corresponding vehicle from its requisite (e.g., 10Mhz integral multiple) rate. The error rate constant KLØD(i) for the i-th vehicle may most easily be determined by simply measuring the apparent motion reported by a vehicle which is in fact still with respect to the common station for a known time interval. Alternatively, KLØD(i) may be determined by an actual quantitative frequency measurement of the relevant oscillator 70 frequency error. The KLØD(I) vector is an array of constants since the oscillator frequency errors are typically stable since the absolute frequency of the oscillator is substantially stable e.g., crystal controlled.

Figure 6:
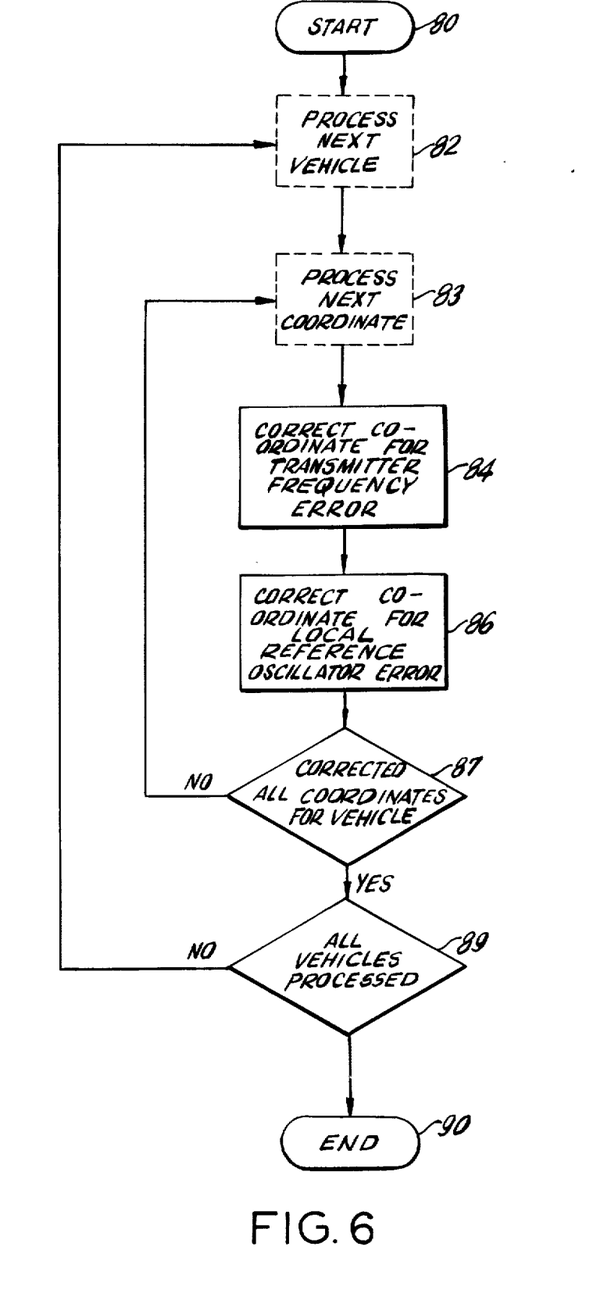
FIG. 6 is a flow chart for operation of the FIG. 5 stored program controlled apparatus.

An illustrative schematic FØRTRAN program will now be described to illustrate the processing for the FIG. 5 apparatus, the flow chart of which is set forth in FIG. 6. It will be appreciated by those skilled in the art that any convenient program language may be employed and that the principles of the present invention is in no way limited to the particular coding set forth in the program listing below stated or to the specific flow chart shown. Moreover, schematic statements are employed to convey meaning rather than to literally conform with any one particular FORTRAN variation. An illustrative program is as follows:

| | |
|---|---|
| DØ I = 1,N | (1) |
| DØ J = 1,3 | (2) |
| C(I,J) = C(I,J)-TE(J) | (3) |
| C(I,J) = C(I,J)-ELT*KLØD(I) | (4) |
| ØUTPUT C(I,J) | (5) |
| CØNTINUE | (6) |
| CØNTINUE | (7) |

The processing above described basically comprises two nested iteratively functioning procedures (so called DØ loops). The inner loop between statements (2) and (6) where "J" is the running index variable corrects all three coordinate counts for any particular vehicle, with the outer loop (bounded by statements (1) and (7)) advancing inner loop processing on a vehicle-by-vehicle basis until the raw information for all vehicles has been processed.

In brief, statement (1) sets a running variable "I" to the next vehicle designation, beginning with a first vehicle and running through the N-th vehicle, each monitored vehicle in the system being assigned a reference number. Once a vehicle designation has been established (e.g., the first vehicle for the first three passes through instructions (2)-(6)), the inner loop comprising instructions (2)-(6) is executed three times (with the indexing parameter "J" being respectively set to equal 1, 2 and 3 for the several operations of the instructions (2)-(6)). Thus, on the first execution of the inner loop, the vehicle 1 will have its first coordinate specifying count (e.g., associated with the channel 1 reporting up-down counter 48 of FIG. 1) stored in C(1,1) corrected; on the next two passes through the instructions (2)-(6) the channel 2 and channel 3 count values stored in C(1,2) and C(1,3) will be corrected. Then process control will pass via instruction (7) to instruction (1) where I will be incremented to "2" to process data for the next (second) monitored vehicle to correct the reported counts C(2,1), C(2,2) and C(2,3), ..., until the final values C(N,1), C(N,2) and C(N,3) are corrected.

The corrections effected for each coordinate of any vehicle begin with instruction (3) where a subject coordinate value C(I,J) is first read into the computer 75 accumulator. Instruction (3) (as compiled) next subtracts from the initial contents of C(I,J) - the raw coordinate value, the error vector value TE(J) which is the transmission error for the j-th channel transmission 1, 2 or 3. Similarly instruction (4) corrects the parameter C (I,J) for a local reference oscillator 70 error component by substracting from the C(I,J) value (corrected for transmission frequency only after instruction (3) is executed) the local reference oscillator 70 produced error given by the product of the elapsed time (ELT) and the vehicle error rate (KL$\phi$D (I)). Of course, the instructions (3) and (4) may be combined, as $$C(I,J) = C(I,J) - TE(J) - ELT*KL\phi D (I) \quad (8).$$

Finally, if desired, an output instruction (5) is employed to load an appropriate cell corresponding to the fully corrected coordinate value for the i-th vehicle, J-th coordinate in matrix 77. For many applications, the instruction (5) will be deleted since the storage cell C(I,J) in memory 74 contains the desired information which, moreover, resposes in a physical location immediately accessible to the central processing unit 75 for any desired purpose. Such purposes may include, for example, vehicle position display or output printing via any output peripheral well known to those skilled in the art, e.g., a cathode ray tube display in conjunction with a stored display algorithm; or to comprise input data to an environment control or operational algorithm such as for dispatch or accounting purposes, or the like. Instructions (6) and (7) simply comprise statements to respectively end the inner DO loop beginning with instruction (2) and the outer DO loop beginning with instruction (1). Some reflection will show that the above detailed operation is identically presented in flow chart form in FIG. 6.

The FIG. 5 arrangement has thus been shown to receive the uncorrected coordinate values from each vehicle, and to correct same for frequency variations.

Figure 7:
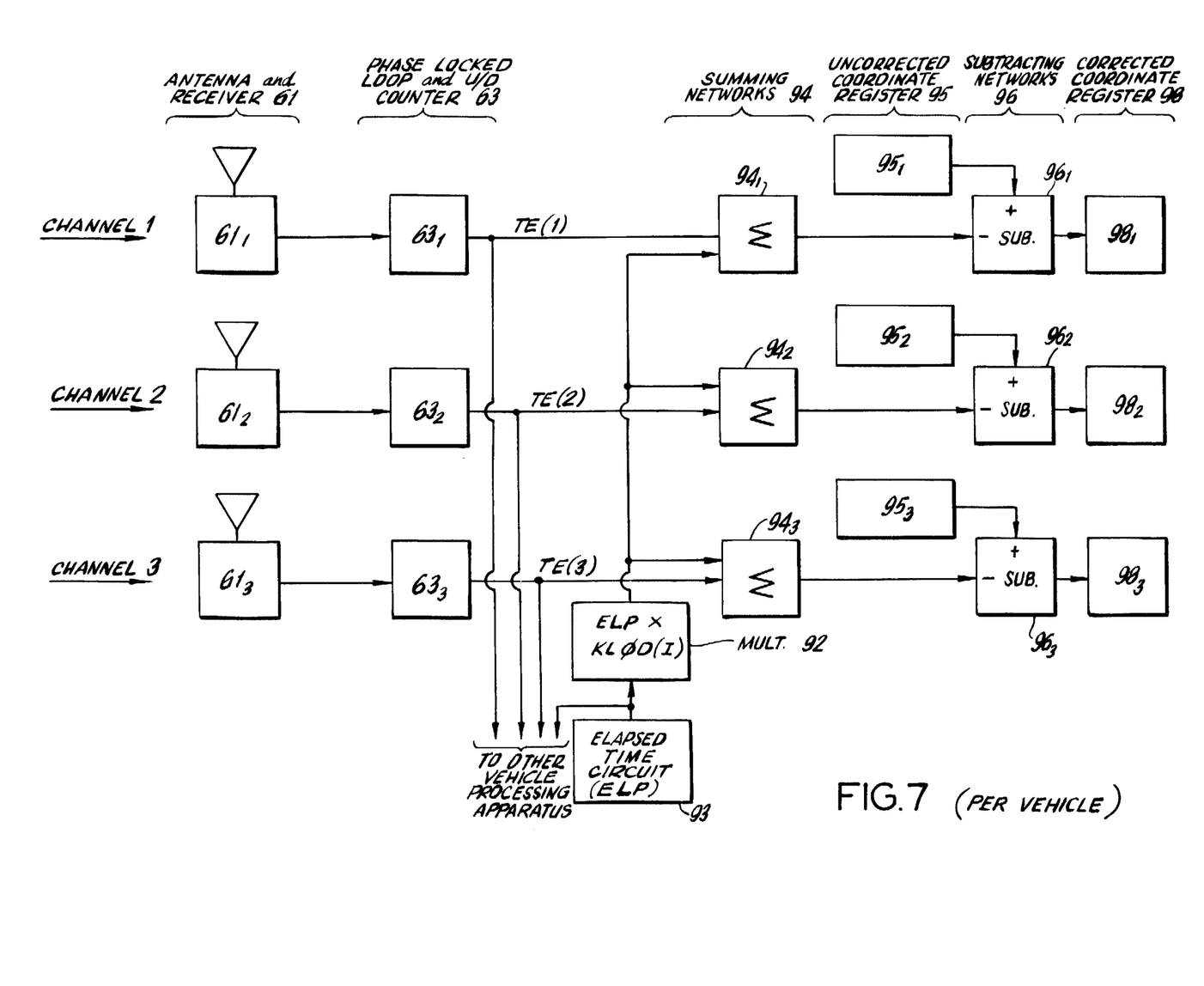
FIG. 7 depicts in block diagram form second illustrative common station equipment for said position locating system.

Finally, FIG. 7 presents a hardware rather than stored program controlled implementation for the common equipment, and performs in a manner parallel to that described above. Elements 61 and 63 perform a function identical to that effected by the like numbered elements in the FIG. 5 arrangement and supply signals to correct for cumulative frequency variations by the respective non-cooperative commercial transmission to a corresponding one of three summing networks 94. An elapsed time since last system clearing or initialization circuit 93 supplies such elapsed time information to an electronic multiplier 92 which multiplies the elapsed time signal with a constant reflecting the error rate for the system vehicle local reference oscillator 70. The multiplier 92 may comprise any multiplying structure well known to those skilled in the art, e.g., a combinatorial or sequential digital multiplier, analog multipliers, rate multiplying apparatus or the like.

The ouput of the multiplier 92 is supplied as a second input to the summing networks $94_1$–$94_3$. The outputs of the networks $94_1$–$94_3$, thus respectively reflecting the total error components for the particular vehicle associated with the FIG. 7 apparatus, are supplied as first inputs (subtrahend) to associated subtracting networks $96_1$–$96_3$. Also supplied as the minuend to the subtracting network 96 is the uncorrected vehicle reported coordinate, i.e., the contents of the corresponding up-down counter 48 which has been loaded into registers $95_1$–$95_3$, the respective registers 96 being comparable to the register matrix 73 of FIG. 5. The output of each substractor $96_i$ thus comprises the vehicle reported i-th coordinate (i.e., movement with respect to the i-th transmitter $61_i$), corrected for all system frequency errors, such contents being loaded in an array of output registers 98. There is, of course, one array of elements or elements pluralities 92, 94, 95, 96 and 98 shown in FIG. 7 for each of the vehicles being processed.

The arrangement of FIG. 7 has thus been shown to correct the vehicle coordinates for system frequency errors.

The above described arrangements are merely illustrative of the features of the present invention. Numerous modifications and adaptations thereof will be readily apparent to those skilled in the art without departing from the spirit and scope of the present invention.

What is claimed is:

1. In combination in displacement determing apparatus for determining displacement information utilizing the phase of a carrier wave, said displacement determining apparatus including means for selecting said carrier wave, divider means for reducing the frequency of said carrier wave, a reference oscillator, phase locked loop means connected to said divider means and said reference oscillator means, said phase locked loop means including phase comparator means, and pulse adding and deleting means for selectively adding pulses to and deleting pulses from the pulse wave supplied by said reference oscillator, accumulator means connected to said pulse adding and deleting means, the improvement comprising:

common station equipment for correcting the contents of said accumulator means for frequency variations in said carrier wave, said common station equipment correcting means comprising:
  a. additional means for selecting said carrier wave,
  b. a common station oscillator,
  c. an up-down counter,
  d. additional phase locked loop means connected to the ouputs of said common station oscillator and said additional carrier wave selecting means for changing the state of said up-down counter means in a direction which reflects any changes in frequency of the wave being monitored, and
  e. means responsive to pulses in said accumulator means and the state of said up-down counter for algebraically combining the pulses of said up-down counter with the contents of said accumulator means to correct the contents of said accumulator means for variations in frequency of said selected carrier wave.

2. A combination as in claim 1 further comprising elapsed time means for providing a signal dependent upon the time elapsed since said accumulator means was last initialized multiplier means connected carried to said elapsed time means for multiplying said elapsed time signal with a constant dependent upon any frequency deviation of said reference oscillator means, and means for correcting the contents of said accumulator means comprising means for linearly combining the contents of said accumulator means and the output of said multiplier means.

3. A combination as in claim 1, wherein said phase locked loop means further comprises additional divider means connected intermediate said phase comparator means and said pulse adding and deleting means.

4. A combination as in claim 1, wherein said phase comparator means supplies an analog output voltage, first threshold means for signalling said pulse adding and deleting means to add a pulse into the pulse wave supplied by said reference oscillator, and second threshold means for signalling said adding and deleting means to delete a pulse from the pulse wave supplied by said reference oscillator.

5. A combination as in claim 1, wherein said carrier wave selecting means includes an additional phase locked loop.

6. A combination as in claim 1, wherein said carrier wave selecting means includes a bandpass filter.

7. A combination as in claim 1, further comprising first and second additional displacement determining apparatus substantially similar to said displacement determining apparatus, said common station means further comprising additional means for correcting the contents of said accumulator means of said first and second additional displacement determining apparatus.

8. A combination as in claim 1 wherein said common station equipment further comprises additional divider means for reducing the frequency of said selected carrier wave, and wherein said common station additional phase locked loop means includes additional phase comparator means, and additional pulse adding and deleting means for selectively adding pulses to and deleting pulses from the pulse wave supplied from said common station reference oscillator.

9. In combination in a radio position monitoring system for identifying the position of at least one vehicle employing phase measurements from a radiated transmission, said vehicle including counter means for measuring phase displacement relative to said transmission responsive to vehicle translation relative to said transmission, the improvement comprising:
common station equipment comprising:
a. means for receiving and storing the count state of said counter means for each vehicle,
b. means for receiving said transmission,
c. a reference oscillator,
d. divider means for reducing said received transmission and said reference oscillator to a like frequency,
e. a bidirectional error counter,
f. phase detector means responsive to phase displacement between the like frequency signals produced by said divider means for selectively advancing said bidirectional counter in an amount and direction dependent upon the phase displacement between said like frequency signals supplied by said divider means, and
g. linear combining means for algebraically combining the vehicle reported count state from said storage means therefor and the contents of said bidirectional counter.

10. A combination as in claim 9 further comprising elapsed time means for providing a signal dependent upon the time elapsed since said system was last initialized, multiplier means connected to said elapsed time means for multiplying said elapsed time signal with a constant reflecting the error rate for the contents of said vehicle counter means, said linear combining means including means for algebraically combining the vehicle reported count state from said storage means therefor with the ouput of said multiplier means.

11. In combination in common station means for correcting coordinate count vehicle positional information determined by vehicles disposed in a field subjected to plural radiated transmissions, there being i such vehicles and j such transmissions, where i and j are independent position integers, means for receiving each transmission, an oscillator, means connected to said oscillator and to said transmission receiving means for providing j apparent motion correction signals dependent upon frequency variations of said transmissions, storage means for storing i.j coordinate count values determined by the i vehicles, first iteratively operative linear summing means for algebraically combining said j apparent motion correction signals and said j coordinate count values supplied by said storage means therefor determined by any one vehicle, and second iteratively operative means effecting serial operation of said first iteratively operative linear summing means for each of the i vehicles.

12. In combination in displacement determining apparatus for determining displacement information utilizing the phase of a carrier wave, radiated over a field, said displacement determining apparatus comprising means for selecting said carrier wave, divider means for reducing the frequency of said carrier wave, a reference oscillator, phase locked loop means connected to said divider means and said reference oscillator means, said phase locked loop means including phase comparator means, pulse adding and deleting means for selectively adding pulses to and deleting pulses from the pulse wave supplied by said reference oscillator, and accumulator means connected to said pulse adding and deleting means, the improvement comprising:
common station equipment comprising:
a. means for storing the count state of said accumulator means, additional means for selecting said carrier wave,
b. means for determining frequency deviations of said carrier wave supplied by said additional carrier wave selecting means, and
c. coordinate correcting means for correcting the count contents of said accumulator means stored in said storage means thereof responsive to the carrier wave deviation signaled by said carrier frequency deviation detecting means.

* * * * *